(12) United States Patent
Liu et al.

(10) Patent No.: US 6,573,303 B2
(45) Date of Patent: Jun. 3, 2003

(54) THERMOPLASTIC ELASTOMERS AND POLYMERS DERIVED FROM RECYCLED RUBBER AND PLASTICS

(75) Inventors: Helen S. Liu, Weymouth, MA (US); Joey L. Mead, Bedford, MA (US); Ross G. Stacer, Ashland, MA (US)

(73) Assignee: University of Massachusetts, Worcester, MA (US)

( * ) Notice: Subject to any disclaimer, the term of this patent is extended or adjusted under 35 U.S.C. 154(b) by 7 days.

(21) Appl. No.: 09/960,620

(22) Filed: Sep. 21, 2001

(65) Prior Publication Data

US 2002/0113333 A1 Aug. 22, 2002

Related U.S. Application Data

(60) Provisional application No. 60/234,256, filed on Sep. 21, 2000.

(51) Int. Cl.[7] .................. C08C 19/00; C08C 19/02; C08J 11/04
(52) U.S. Cl. .................. 521/41; 521/42; 521/42.5; 525/69; 525/192; 525/194; 525/197; 525/374; 525/387
(58) Field of Search .................. 525/192, 194, 525/197, 374, 387, 69; 571/41, 42, 42.5

(56) References Cited

U.S. PATENT DOCUMENTS

| | | | |
|---|---|---|---|
| 5,969,053 A | 10/1999 | Bauman et al. | |
| 6,015,861 A | 1/2000 | Mertzel et al. | |
| 6,139,447 A | 10/2000 | Ohama | |
| 6,207,723 B1 | 3/2001 | Matsushita et al. | |
| 6,387,965 B1 * | 5/2002 | Benko et al. | 521/41 |

FOREIGN PATENT DOCUMENTS

DE    19607281 A1    8/1997

OTHER PUBLICATIONS

Aubert Y. Coran, "Vulcanization: Conventional and Dynamic" The Institute of Polymer Engineering, The University of Akron, Akron, OH 44325, vol. 68, pp. 351–376, Received Mar. 14, 1995.

A. Chidambaram et al "Reactive Blending of Chemically and physically Treated Waste Rubber with Polymethyl Methacrylate" Institute of Polymer Engineering, The University of Akron, Ohio, USA, pp. 2927–2934, ANTEC 1994.

James McKirahan, et al "Thermoplastic Composites of Recycled High Density Polyethylene and Recycled Tire Particles" pp. 3110–3114, ANTEC 1996.

M. Pittolo, et al "Recycled Rubber Crumb as a Toughener of Polystyrene" School of Chemical Engineering and Industrial Chemistry, University of New South Wales, pp. 97–106, Received Sep. 4, 1984.

* cited by examiner

Primary Examiner—Nathan M. Nutter
(74) Attorney, Agent, or Firm—Nutter McClennen & Fish LLP (57) ABSTRACT

Materials ranging from impact-modified thermoplastics to thermoplastic elastomers (TPE) can be obtained from blends of phase compatibility-treated recycled thermoset rubber with thermoplastic polymers by varying the ratio of components in the blend, or by changing the components themselves. The rubber component may include carbon black, or other fillers and additives, and it may be selected from among a variety of thermoset rubbers, both natural and synthetic. The thermoset rubber component can be obtained from a rubber material recycled according to a variety of known techniques. The thermoplastic component can be virtually any suitable polymer, the properties of which can be advantageously modified by combination with a rubber. Polyolefins are among the more preferred thermoplastic components.

15 Claims, 9 Drawing Sheets

Figure 1. Possible reactions during reactive blending

Figure 2. Break tensile strength of recycled EPDM/PP blends

Figure 3. Break elongation of recycled EPDM/PP blends

Figure 4. Crystallinity of recycled EPDM/PP blends

Figure 7. Influence of MFI of PP on break elongation

Figure 5. Dynamic mechanical analysis of EPDM/PP blend (50/50 weight %)

Figure 8. Influence of MFI of PP on degree of crystallinity

Figure 6. Influence of MFI of PP on break tensile strength

Figure 16 Thermoplastic elastomer from recycled rubber and plastics

*Effect of Rubber Particle Size*

THERMOPLASTIC ELASTOMERS AND POLYMERS DERIVED FROM RECYCLED RUBBER AND PLASTICS

CROSS-REFERENCE TO RELATED APPLICATIONS

This application is based on and claims priority from U.S. Patent Application No. 60/234,256, filed Sep. 21, 2001.

STATEMENT REGARDING FEDERALLY SPONSORED RESEARCH

Not Applicable.

FIELD OF THE INVENTION

The invention relates to the novel thermoplastic materials and impact-modified plastics produced by blending recycled rubber with thermoplastics.

BACKGROUND OF THE INVENTION

In recent years, there has been substantial progress in the recycling of polymeric materials. Particularly noteworthy has been the development of the Plastic Container Code System used by consumers and community groups to identify, separate, and recycle thermoplastic materials. Unfortunately, progress in the area of recycling thermosetting polymers, such as rubbers, has not been as successful, since these materials cannot be reformed once they have been crosslinked. As a result, other methods to recycle the rubber must be found. Grinding is one method to recycle a thermoset. The ground rubber can be used alone or mixed with thermoplastics to achieve the desired properties, such as impact modification.

The disposal or attempted disposal of non-recycled materials has become a problem in recent years. Numerous environmental hazards are posed by scrap rubbers. For example, scrap tires present self-sustaining fire hazards, and as rubbers such as tires burn, they release toxic compounds into the atmosphere. Rubber piles and dumps are also considered to be a breeding ground for disease-carrying pests.

The market for thermoplastic elastomers has grown dramatically because of the ability to recycle and process these materials using conventional thermoplastics processing equipment. The unique characteristics of thermoplastic elastomers make them an attractive alternative to conventional elastomers in a variety of markets, such as the automotive industry. Consequently, conversion of a conventional elastomer (thermoset) into a thermoplastic elastomer through blending with thermoplastics has the potential to introduce new market applications for scrap rubber.

Some researchers have focused research efforts in this area. For example, Pittolo et al, *Rubber Chem. Technol.* 58, p.97 (1985), have studied the effect of scrap rubber in polystyrene (PS) to increase impact strength. Their preliminary investigations indicated that recycled rubber crumb acts as a toughening agent for the brittle thermoplastic. The toughness of the resultant materials increased with the degree of rubber/matrix adhesion and decreased with rubber particle size. However, this limits the consumption of scrap rubber in applications because no more than 20% of rubber is typically used in the blends. Other researchers, see McKirahan et al, *ANTEC* '96, p. 3110, have studied blends of high-density polyethylene (HDPE) with recycled tire rubber. It was found that tensile strength and hardness decreased with greater rubber concentrations, and ductility improved above 5% rubber content. Data were reported only for rubber concentrations up to 30%. Chidambaram et al, *ANTEC* '94, p. 2927, studied the effect of surface treatment of rubber particles on reactive blending with poly (methylmethacrylate) and found that enhanced mechanical properties were possible.

Despite the aforementioned research, there remains a need to encourage recycling and to improve the quality and properties of recycled materials.

SUMMARY OF THE INVENTION

Materials ranging from impact-modified thermoplastics to thermoplastic elastomers (TPE) can be obtained from blends of recycled thermoset rubber with thermoplastic polymers by varying the ratio of components in the blend, or by changing the components themselves. The rubber component may include carbon black, or other fillers and additives, and it may be selected from among a variety of thermoset rubbers, both natural and synthetic. The thermoset rubber component can be obtained from a rubber material recycled according to a variety of known techniques. The thermoplastic component can be virtually any suitable polymer, the properties of which can be advantageously modified by combination with a rubber. Polyolefins are among the more preferred thermoplastic components.

In one aspect, the present invention focuses on developing TPE materials from polyolefins (e.g., polypropylene) and recycled ground rubber. The components, particularly the rubber component, are subjected to phase compatibility treatments that are effective to improve the quality of the scrap rubber/plastic blends in response to the structural requirements of several potential applications. The effect of rubber particle size, melt flow index (MFI) for the thermoplastic component, and weight percent of the constituent fractions are also factors that can contribute to the physical properties of the resultant blends. The melt flow index of the thermoplastic component is one particularly significant variable that influences the mechanical properties of the resultant blends. Through proper selection of the components and phase compatibility techniques, blends are able to be tailored to specific applications.

Among the applications for materials made according to the invention are recreational and athletic surface and flooring materials, industrial flooring and footpaths, anti-static computer mats, mounting pads and shock absorbers, membrane protection, airfield runways and roadway surfaces, shoe soles, carpet underlay, automotive floor mats, mud flaps and molded protection strips, automotive door and window seals, gaskets, landscaping materials, watering systems, pipes and hose materials, and flower pots.

BRIEF DESCRIPTION OF THE DRAWINGS

The invention will be more fully understood from the following detailed description taken in conjunction with the accompanying drawings, in which.

DETAILED DESCRIPTION OF THE INVENTION

One having ordinary skill in the art will appreciate further features and advantages of the invention based on the embodiments described below. All publications and references cited herein are expressly incorporated herein by reference in their entirety.

The invention provides novel thermoplastic elastomers and impact-modified thermoplastics as a result of a blend of a recycled thermoset rubber component with a thermoplastic polymer component. Apart from providing such new and useful materials with a variety of commercial applications, the invention helps contribute a solution to the environmental problems that can result from the disposal or attempted disposal of non-recycled rubbers by providing an effective way to recycle such materials.

In one aspect, the invention provides a recycling technique for thermoset rubbers. In another aspect, it provides new materials that result from this recycling technique.

According to the present invention, thermoset rubbers are blended with thermoplastic polymers to yield thermoplastic elastomers (TPEs) and/or impact-modified thermoplastics. The thermoset rubber component can be used in the blend in an amount ranging from about 5 to 85 wt. % of the blend, and, more preferably, at about 10 to 80 wt. % of the blend. The thermoset rubber can be selected from among a variety of recycled thermoset rubber materials, including those having carbon black. Exemplary rubbers include natural rubber, styrene-butadiene rubber (SBR), ethylene-propylene-diene rubber (EPDM), ethylene propylene rubber (EPR), polychloropene, nitrile rubber, epichlorohydrin, fluoro-elastomer rubber, silicone rubber, butyl rubber, polyisoprene, and polybutadiene. Sources of the recycled rubber materials include a variety of materials such as tires, shoe soles, and roofing materials. Useful average particle sizes for the rubber component are in the range of about 500 microns or smaller. In one embodiment, the rubber component has a particle size in the range of about 40 to 500 microns.

The thermoplastic component of the blend is present in the blend in an amount in the range of about 15 to 95 wt. % of the blend, and more preferably, at about 20 to 90 wt. % of the blend. The thermoplastic material preferably is, but need not be, a virgin thermoplastic. A variety of thermoplastic materials may be used according to the present invention, provided that they are compatible with recycled thermoset rubbers and that their properties and/or performance can be enhanced by the combination with such rubbers. Exemplary thermoplastic materials include polyolefins, and polyolefin-based compounds (including polyolefin-containing copolymers), polystyrenes and copolymers thereof, polyurethanes and copolymers thereof, polyesters and copolymers thereof, vinyl polymers and copolymers, polyamides and copolymers thereof. Among the more preferred thermoplastic materials are polyolefins, particularly polypropylenes. In an exemplary embodiment the thermoplastic material has a melt flow index (MFI) in the range of about 0.45 to 20 g/10 minutes, and more preferably in the range of about 0.75 to 12 g/10 minutes.

A major challenge to blending a recycled rubber component with a thermoplastic is the incompatibility between the two materials. Thermoplastics, such as polypropylene, tend to be semi-crystalline materials while most rubbers are amorphous thermosets. Crystalline segments within the thermoplastic are resistant to intrusion of rubber segments. Crosslinking of the rubber makes it difficult for the thermoplastic to disperse during mixing. Therefore, compatiblizing techniques were found to be useful to obtain the desired physical properties.

Accordingly, it is best to enhance the phase compatibility of the thermoset and thermoplastic components. This can be accomplished by reactive blending of the components or by surface treatment of the rubber component.

Surface treatment of the rubber can be accomplished by dispersing the rubber particles in an aqueous solution together with an oxidizing agent. In one embodiment the rubber particles are added to an acetone solution (e.g., 10% acetone/90% water) and a quantity (e.g., about 1 to 20% by wt. of the rubber) of an oxidizing agent (e.g., potassium permanganate ($KMnO_4$)) is added to the rubber suspension to oxidize the rubber surface. After a suitable time period (e.g., about 24 hours) the purple color of the $KMnO_4$ disappears, indicating the completion of the reaction. The by-product, $MnO_2$, is further oxidized for separation by 30% aqueous $H_2O_2$ solution with 0.1% $H_2SO_4$ dissolved into the $H_2O_2$ solution. The rubber is then separated by filtration and washed with water until the filtrate is neutral. The treated rubber is then air dried. Following this process the rubber is blended with a thermoplastic. In one embodiment, approximately 1 to 10% by wt. of a maleated polypropylene may be added to react with surface hydroxyl groups tp graft polypropylene to the rubber.

One of ordinary skill in the art will appreciate that a variety of other oxidizing agents may be used as well. These additional oxidizing agents include hydrogen peroxide, osmium tetroxide, hydrogen peroxide urea complex, sodium percarbonate, sodium perchlorate, sodium perborate, potassium peroxymonosulfate, and a potassium permanganate/potassium periodate aqueous solution.

Reactive blending involves blending the thermoplastic component with the rubber component and a free radical generating compound at a temperature at or above the activation or degradation temperature of the free radical generating compound. In one embodiment, useful where the free radical penetrating compound is a liquid, the rubber and free radical generating compound are combined before blending the rubber with the thermoplastic component. Alternatively, the free radical generating compound may be added to the thermoplastic component concurrently with the rubber or it may be added after the addition of the rubber component to the thermoplastic component.

Figure 1:
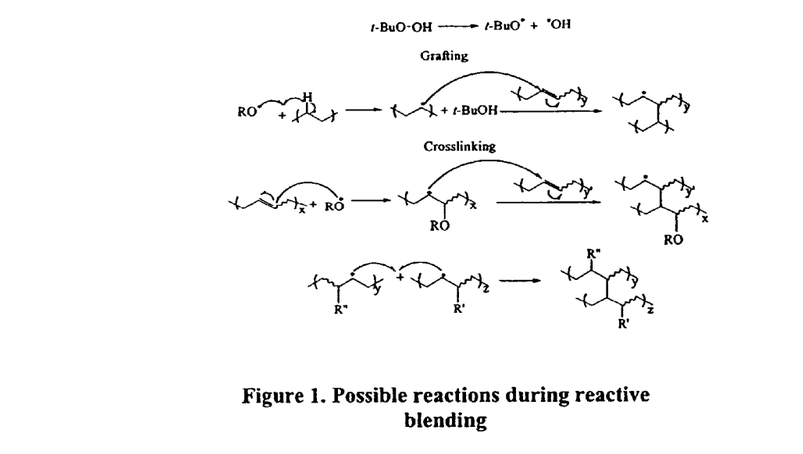
FIG. 1 illustrates possible reactions that take place during reactive blending.

In an embodiment that combines recycled EPDM and polypropylene, the majority of the double bonds in the recycled EPDM are still available even though it is vulcanized. By adding appropriate grafting agents, those double bonds can be utilized to graft polypropylene onto the rubber particle surface. This reaction leads to better compatibilization between the polymer and rubber phases. Additionally, the reactive blending with high rubber content may also promote crosslinking between rubber particles. FIG. 1 shows the two possible reactions during a reactive blending procedure conducted at a temperature of about 200° C. using t-butyl hydroperoxide with a half-life of 4.81 hrs at 175° C.

The reactive blending process typically utilizes a free radical generating compound that is present at a range of about 0.5 to 5% by weight of the rubber component. As noted above, the free radical generating compound may be combined with the rubber component before reactive blending with the thermoplastic material. This is particularly useful where the free radical generating compound is a liquid. According to one embodiment, the free radical generating compound and the rubber component can be combined at room temperature for a duration of about 1 minute to 1 hour. However, one of the ordinary skill in the art will readily appreciate that these two components can be combined at a variety of alternative temperatures, provided that the temperature is below the activation temperature for the free radical generating compound.

In one embodiment the free radical generating compound is a peroxide. One of ordinary skill in the art will appreciate that a variety of peroxides may be used for this reactive blending process provided that the peroxide is compatible with the rubber and the temperature range to be used. Further, the peroxides may be in either the solid or the liquid state. Exemplary peroxides include dibenzoyl peroxide; t-butyl hydroperoxide; and di-tert butyl peroxide.

Another exemplary class of free radical generating compounds useful with the present invention is azo compounds. One of ordinary skill in the art will readily appreciate that the term "azo compounds" refers to a class of organonitrogen derivatives having as a general formula:

R—N=N—R' where R and R' can be the same or different organic groups. A variety of azo compounds can be used in the reactive blending step of the present invention, provided that the azo compounds are compatible with the rubber component and the temperature range to be used. Further, the azo compounds may be in either the solid or liquid state. Exemplary azo compounds include 1,1'-azobis(cyclohexanecarbonitrile); azodicarbonamide; 2,2'-azobis(2,4-dimethylpentenenitrile); 2,2'-azobis(2-ethylpropanimidamide).2HCl; 2,2'-azobis(isbutyronitrile); 2,2'-azobis(2-methyl-butanenitrile); 4,4'-azobis(4-cyanopentanoic acid); 2,2'-azobis(2-acetoxypropane); 2-(tert-butylazo)-4-methoxy-2,4-dimethylpentanenitrile; 2-(tert-butylazo)-2,4-dimethylpentanenitrile; 4-(tert-butylazo)-4-cyanopentanoic acid; 2-(tert-butylazo) isobutyronitrile; 2-(tert-butylazo)-2-methylbutanenitrile; 1-(tert-amylazo)cyclohexanecarbonitrile; 1-(tert-butylazo) cyclohexanecarbonitrile; and 1-(tert-butylazo)-formamide.

The azo compounds have the added benefit that they can be used to produce a foamed product in addition to promoting compatibilization.

In one embodiment, following any premixing of the rubber and free radical generator, the rubber and thermoplastic components are blended at elevated temperatures (e.g., 180–220° C.) to yield the desired recycled material. One of ordinary skill in the art will appreciate that the processing temperature should be at or above the activation or decomposition temperature of the free radical generating compound, and ultimately this temperature will vary depending on the thermoplastic component utilized. Further, a variety of effective blending techniques can be used. By way of example, however, exemplary blending techniques are described below. Although the techniques discussed below primarily refer to the rubber material as EPDM and the thermoplastic as a polypropylene (PP), e.g., polypropylene, maleated polypropylene, and phenolic-treated polypropylene, it is understood that various other thermoset rubbers and thermoplastic polymers may be used, in accordance with the discussion above.

According to one reactive blending technique, recycled EPDM rubber at 80 mesh and 170 mesh particle sizes (available from Erickson Inc.) was blended with polypropylene having a melt flow index of 0.75 g/10 min and 12 g/10 min in a Rheocord System 40 (available from Haake Buechler). Prior to blending the EPDM was combined with t-butyl hydroperoxide at about 0.5–1.0 wt. % of the EPDM at room temperature for about 30 minutes.

After equilibrium temperature (200° C.) and a rotor speed of 30 rpm was reached, the thermoplastic material was added. The EPDM rubber component was blended in after the plastic material was completely melted, as indicated by a stabilized torque reading, which was usually obtained after 4 to 5 minutes. Mixing of the blend was stopped after a specified time (two to ten minutes), or when the torque became constant. The rubber-plastic composite was removed and then ground using a laboratory mill (Thomas Wiley, model 4) with a 40-mesh screen. It is desirable to obtain particles that are not greater in size than 40 mesh in order to optimize the efficiency of compression molding. Further, it is desirable to avoid air gaps or voids between larger particle sizes to optimize mechanical properties.

According to another reactive blending technique, blending of the thermoplastic and rubber components can be conducted substantially concurrently with the incorporation of the free radical generating compound. An 80 mesh recycled EPDM rubber (available from Rouse) was blended with a polypropylene (available from Fina) having a number average molecular weight ($M_N$) of 84 and 40 in a Haake Polylab system at a temperature of about 180–200° C. The polypropylene material was added to the system first and allowed to melt. After the PP was fully melted, as indicated by a stabilized torque reading, which was usually obtained in four to five minutes, untreated EPDM rubber was added to the mixer. One minute after EPDM addition the appropriate azo compound was added to the mixture at 4.3 wt. % of the rubber and the mixture was blended for one minute. The rubber-plastic composite was removed and ground using a laboratory mill (Thomas Wiley, model 4) with 40-mesh screen.

The properties of the resulting recycled materials can be evaluated by first molding test specimens from the recycled product and then subjecting the specimens to a variety of standard tests. For example, compression molding of an EPDM-modified PP can be performed in a heated press (e.g., Carver, Model C). The machine should first be preheated to equilibrium at about 225° C. Rubber test specimen sheets can be prepared using a square-shaped aluminum frame (90 mm×150 mm) with a thickness of 1.5 mm is then sandwiched by two aluminum plates to form the mold. During molding, materials should be preheated for about 5 minutes, then compressed to about 3.4 to 30 MPa for 5 minutes. Pressure is then slowly ramped up to about 8 to 100 MPa during a 5-minute period. Sheets can be cooled to room temperature under about an 8 to 100 MPa load using a Schrader cooling press. The sheets can then be removed and die-cut into test specimens.

The following tests were conducted to evaluate the physical properties of the recycled material.

Tensile specimens were prepared using a ½ scale ASTM D412 die. Tensile testing was performed using an Instron 6025 with attached computer operating system and a crosshead speed of 5 cm/min. Elongation was determined using crosshead displacement and the gage section as the original length.

Shore A hardness tests were performed using a hand-held tester, following the procedures outlined in ASTM D2240. Ten readings across the length of the specimen were recorded for each sample.

Differential Scanning Calorimeter (DSC) characterization was performed using a TA Instruments Module 912. Sample size ranged from 7.0 to 10.0 mg, and a heating rate of 10° C./min was selected as a reference condition.

Dynamic Mechanical Analysis (DMA) was accomplished in forced dynamic shear using a rectangular torsion specimen in a Rheometrics 605. Temperature sweeps were performed over the range from −100° C. to 50° C. with heating rate of 3° C./min.

The data presented below was generated using a blend of recycled EPDM and polypropylene. The samples that were subjected to reactive blending were processed as described above using t-butyl hydroperoxide as the free radical generating compound.

Figure 2:
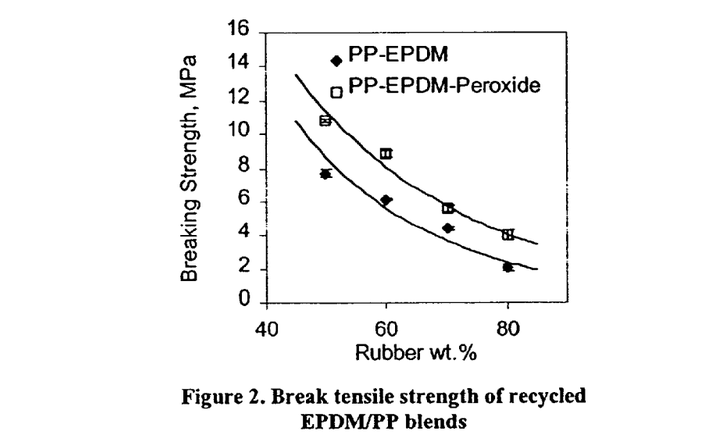
FIG. 2 is a graph illustrating the break tensile strength of recycled EPDM/PP blends.

FIG. 2 presents the tensile strengths of the EPDM/PP blends both with and without reactive blending processing. Two observations are readily apparent. First, the stress capability of the blend decreases as the rubber content goes up. Basically, this can be explained through a volume rule of additivity where the higher strength PP molecules are gradually replaced by the lower strength EPDM phase. Secondly, reactive blending dramatically enhanced the stress capability of all the blends. Percentage increases as great as 80% at the highest rubber content were observed.

Figure 3:
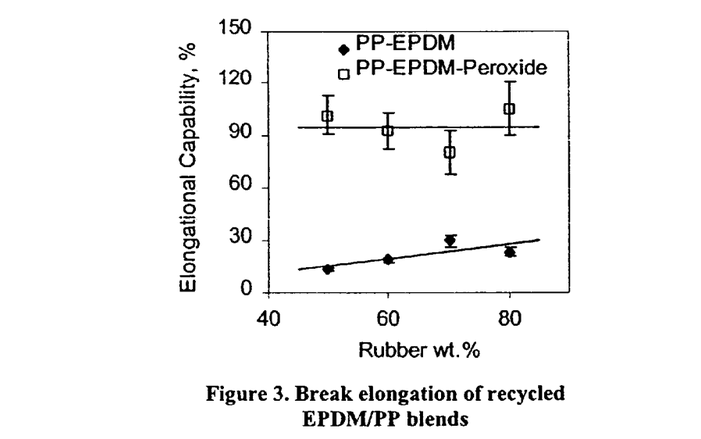
FIG. 3 is a graph illustrating the break elongation of recycled EPDM/PP blends.

FIG. 3 shows the elongational capability results that corresponds to the breaking stresses reported in FIG. 2. Reactive blending utilizing t-butyl hydroperoxide again provided significant improvement in all cases. Samples without reactive blending did not even provide rubber-like properties. Specifically, elongational capabilities of the reactive blends of 105% and 110% were obtained at 50 and 80% rubber content, respectively.

Figures 4, 7:
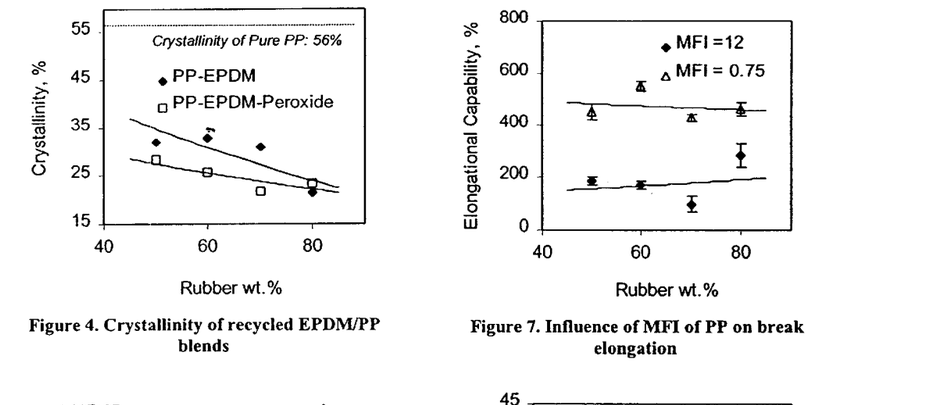
FIG. 4 is a graph illustrating the crystallinity of recycled EPDM/PP blends.
FIG. 7 is a graph illustrating the influence of MFI on PP break elongation.

A plausible explanation for the above results is a change in crystallinity. As shown in FIG. 4, as the rubber wt. % increases, PP crystallinity decreases. This suggests that superior dispersion of PP in the rubber matrix was obtained. Also, FIG. 4 indicates that the addition of the peroxide initiates certain reactions, which in turn reduces the degree of crystallinity. This results in higher compatibility of the plastic phase within the rubber phase. Better reaction leads to superior tensile properties.

Figure 5:
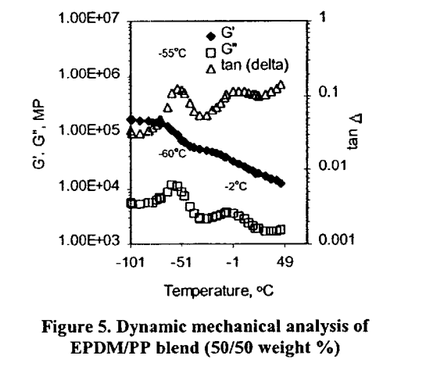
FIG. 5 is a graph illustrating the dynamic mechanical analysis of an EPDM/PP blend (50/50 wt. %).

Evidence that both materials continue to exist as separate phases within the blend can be seen in FIG. 5. This figure presents DMA results for 50/50 wt. % blend. Two dispersion peaks are clearly apparent in both the G" (shear loss modulus) and tan δ data. The low temperature dispersion peak for G" occurs at −60° C., closely approximating the glass transition temperature ($T_g$) of the pure EPDM. Similarly, the other peak in G" occurs near −2° C., or the $T_g$ of the PP.

In addition to material factors, processing conditions can also affect the properties of the blends. In order to determine the optimum blending conditions, a design of experiments (DOE) on the processing conditions and other variables was performed. Six factors with two levels were investigated in EPDM/PP blending. These factors and the experimental parameters investigated are shown in Table 1.

TABLE 1

| Controlled Factors and Levels in Experimental Design | | |
|---|---|---|
| Factors | Low | High |
| Blending Temperature | 190° C. | 220° C. |
| Blending Speed | 30 rpm | 60 rpm |
| Blending Time | 2 mins | 6 mins |
| wt. % of Peroxide with Respect to Rubber | 0.5% | 1% |
| Rubber Particle Size | 80 mesh | 170 mesh |
| MFI of PP | 0.45 g/ 10 min | 12 g/ 10 min |

DOE results indicated that none of the factors in Table 1 or the interaction between these factors had an appreciable influence on the breaking strength of the blends. On the other hand, elongational capability results identified the MFI of the PP as an important factor. That is, the higher the melt flow for the PP, the lower the elongational capability. This is somewhat counter-intuitive since a high MFI indicates lower molecular weight, which suggests better mixing or blending. An explanation for this unexpected behavior can be obtained from the crystallinity change of the PP. The lower the melt flow of PP, the higher the molecular weight and the lower the crystallinity.

A second important factor identified from the DOE is the size of the rubber particles. Specifically, the smaller the rubber particle, the greater the elongational capability. This is believed to be related to the larger rubber surface area of the small rubber particle system, which provides better compatibility, and, hence, enhanced elongational capability. The effect of particle size on mechanical properties has been also observed in the work of Coran et al, *Rubber Chem. Technol.*, 68, p. 351 (1995).

As previously discussed, two significant factors establishing the mechanical properties of the blends are the MFI of PP and the rubber particle size. Hence, additional investigations were conducted on the influence of MFI by preparing blends using different MFI of PP and EPDM rubber. For this limited portion of the study, reactive blending was not utilized.

Figure 6:
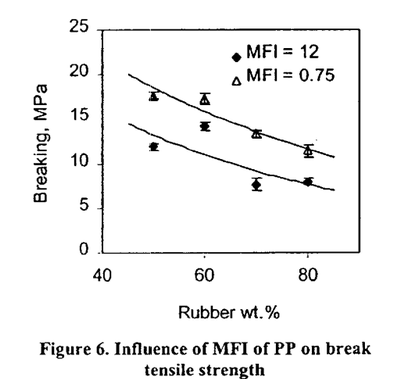
FIG. 6 is a graph illustrating the influence of MFI on PP break tensile strength.
Figure 8:
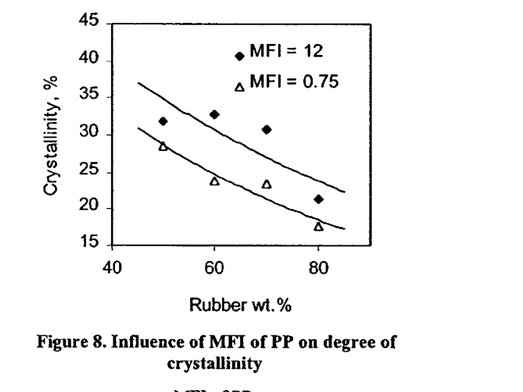
FIG. 8 is a graph illustrating the influence of MFI of PP on degree of crystallinity.

Two polypropylene resins with different MFI values (12 and 0.75) were blended with the recycled EPDM. Resultant stress capability data are presented in FIG. 6. As before, breaking stress decreases as the rubber content increases. The effect of the lower MFI can be seen as an approximately 5 MPa increase in stress capability for all blends considered. Even greater improvements were observed when elongational capability was considered. These data are presented in FIG. 7. By changing the MFI of the PP from 12 to 0.75 MFI, a doubling in the strain capability was observed. The relationship between these results and the crytallinity of the PP phase can be seen through FIG. 8. This figure shows that lower MFI PP has less crystallinity, which suggests better compatibility between the two phases.

Figure 16:
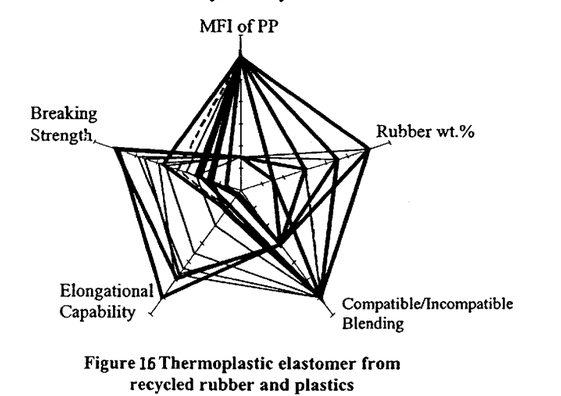
FIG. 16 is a system diagram summarizing the influence of various factors on properties of the resulting blends.

A system diagram, FIG. 16, was constructed to summarize the above findings. This leads to the conclusion that over a very broad range, the mechanical properties as evidenced by stress and strain capability can be tailored by varying ingredients, MFI of PP, weight percentage of recycled rubber, and/or adapting different compatiblizing techniques.

The following examples serve to illustrate the invention.

EXAMPLE 1

Recycled EPDM rubber (80 mesh; available from Rouse) was blended with Polypropylene 3181 [available from Fina] ($M_N$=84 daltons) at a EPDM:PP wt. % of 75:25. The polypropylene was added to a Haake Polylab after an equilibrium temperature (180° C.) and a 30 rpm rotor was reached. The EPDM was added to the polypropylene melt and blended for about 1 minute. Thereafter, the appropriate free radical generating compound was added and blending continued for approximately an additional minute. Following blending the recycled material was collected, ground using a laboratory mill with a 40-mesh screen, and molded into test specimens. A variety of tests were performed and the data are displayed below in Table 2.

TABLE 2

| Chemicals | No FRG | Azo | Benz | Hydro |
|---|---|---|---|---|
| Amount of chem. (g) | 0 | 0.45 | 0.45 | 0.45 |
| wt % | 0 | 1 | 1 | 1 |
| Blending Times (sec) | 0 | 60 | 60 | 60 |
| Process T (° C.) | 181–194 | 181–195 | 181–197 | 182–195 |
| Break | 13.05 | 14.09 | 11.5 | 11.84 |
| Stress | 13.45 | 13.62 | 11.44 | 12.82 |
| [MPa] | 12.19 | 14.46 | 10.66 | 12.53 |
|  | 11.54 | 14.77 | 10.5 | 11.7 |
|  |  | 13.3 | 10.26 | 12 |
| Avg. | 12.56 | 14.05 | 10.87 | 12.18 |
| STD | 0.86 | 0.60 | 0.56 | 0.48 |
| CV % | 6.83 | 4.26 | 5.19 | 3.92 |
| Break | 329.5 | 457.5 | 359 | 384.6 |
| Strain | 401.7 | 436.5 | 351.1 | 428.6 |
| [%] | 329.4 | 436.5 | 335.4 | 394.4 |
|  | 288.8 | 462.7 | 305.2 | 403 |
|  |  | 466.6 | 309.9 | 406.3 |
| Avg. | 337.4 | 452.0 | 332.1 | 403.38 |
| STD | 47.0 | 14.5 | 24.0 | 16.42 |
| CV % | 13.9 | 3.2 | 7.2 | 4.07 |

FRG = free radical generating compound
Azo = Azodicarbonamide
Benz = Dibenzoyl peroxide
hydro = tert-butyl hydroperoxide

EXAMPLE 2

Recycled EPDM rubber (80 mesh; available from Rouse) was blended with lower molecular weight ($M_N$=40 daltons) polypropylene (PP 3429 available from Fina) having a MFI of 5 g/10 min) at a EPDM: PP wt. % ratio of 50:50 as follows. The polypropylene was added to a Haake Polylab and processed until melted (about 5 minutes). The system was operated at a rotor speed of about 30 rpm and at temperatures specified below. The EPDM was added to the polypropylene melt and blended for about 1 minute. Thereafter, the appropriate free radical generating compound was added and blending continued for approximately an additional minute. Following blending the recycled material was collected and processed into test specimens. Tensile strength was evaluated after cooling for 30 minutes at 81° F. and 20 hours in air at room temperature. The data obtained is shown in Table 3.

TABLE 3

| FRG | Wt % FRG | Proc. T. (° C.) | Max. Stress (MPa)/ (Std. Dev.) | Brk. Stn (%)/ (Std. Dev.) |
|---|---|---|---|---|
| None | — | 190–210 | 15.28 (0.86) | 149.74 (22.40) |
| butylhydroperoxide | 4.3 | 180–200 | 15.8 (0.66) | 221.80 (32.20) |
| dibenzoyl peroxide | 4.3 | 180–194 | 15.77 (0.66) | 213.40 (31.37) |
| 1,1'-Azobis (cyclohexanecarbontrile) | 4.3 | 180–192 | 14.59 (0.36) | 200.92 (22.54) |
| Azodicarbonamide | 4.3 | 189–193 | 16.10 (0.41) | 283.32 (28.55) |
| Di-tertbutylperoxide | 4.3 | 180–190 | 13.02 (0.45) | 100.34 (14.54) |

FRG = free radical generating compound

EXAMPLE 3

Following the procedure of Example 2, 80 mesh recycled EPDM (available from Rouse) was blended with PP-3181-polypropylene $80_{MN}$ at a wt. % ratio of EPDM: PP of 60:40. Failure properties were evaluated after water cooling for 30 minutes at 27° C. and air cooling at room temperature for 20 hours. The data obtained are shown in Table 4.

TABLE 4

| Chemicals | FRG | Benz | Benz | Azo | Azo |
|---|---|---|---|---|---|
| Amount of chem.. (g) | 0 | 1.1 | 1.1 | 1.1 | 1.1 |
| wt % | 0 | 4.3 | 4.3 | 4.3 | 4.3 |
| Blending Times (sec) | 0 | 60 | 60 | 60 | 60 |
| Process T | 203–207 | 206–214 | 185–196 | 185–205 | 182–195 |
| Break | 13.24 | 11.74 | 14.58 | 14.67 | 15.34 |
| Stress | 13.74 | 12.06 | 14.76 | 16.78 | 16.02 |
| [MPa] | 13.59 | 11.36 | 14.04 | 16.74 | 14.6 |
|  | 14.07 | 12.32 | 13.29 | 16.04 | 15.37 |
|  |  | 12.16 | 14.62 | 15.59 | 16.43 |
| Avg. | 13.63 | 11.93 | 14.24 | 15.96 | 15.55 |
| STD | 0.31 | 0.38 | 0.59 | 0.88 | 0.70 |

TABLE 4-continued

| Chemicals | FRG | Benz | Benz | Azo | Azo |
|---|---|---|---|---|---|
| CV % | 2.26 | 3.20 | 4.18 | 5.50 | 4.52 |
| Break | 303.8 | 202.8 | 340.6 | 339.3 | 349.1 |
| Strain | 307.1 | 183.7 | 337.3 | 407.5 | 430.4 |
| [%] | 289.4 | 219.8 | 312.5 | 396.3 | 371.4 |
|  | 282.2 | 164.7 | 278.2 | 391.7 | 365.4 |
|  | 265.4 | 205.4 | 307.1 | 395.7 | 398.3 |
| Avg. | 289.4 | 195.3 | 315.1 | 386.1 | 382.9 |
| STD | 17.3 | 21.4 | 25.4 | 26.8 | 31.9 |
| CV % | 6.0 | 11.0 | 8.1 | 6.9 | 8.3 |

FRG = free radical generating compound
Azo: Azodicarbonamide
Benz: Dibenzoyl peroxide

EXAMPLE 4

Following the procedure of Example 2, 80 mesh recycled EPDM (available from Rouse) was blended with PP-3429 polypropylene (40 $M_N$) available from Fina at a wt. % ratio of EPDM:PP of 70:30. Failure properties were evaluated after water cooling for 30 minutes at 27° C. and air cooling at room temperature for 20 hours. The data obtained are shown in Table 5.

TABLE 5

| Chemicals | FRG | Azo | Benz |
|---|---|---|---|
| Amount of chem. (g) | 0 | 1.16 | 1.16 |
| wt % | 0 | 4.3 | 4.3 |
| Blending Times (sec) | 0 | 60 | 60 |
| Process T | 183–191 | 183–191 | 183–194.5 |
| Break | 11.47 | 11.96 | 10.09 |
| Stress | 11.56 | 11.7 | 10.86 |
| [MPa] | 11.92 | 12.73 | 11.43 |
|  | 11.45 | 12.61 | 10.52 |
|  | 11.47 | 11.83 | 10.21 |
| Avg. | 11.57 | 12.17 | 10.62 |
| STD | 0.20 | 0.47 | 0.54 |
| CV % | 1.71 | 3.87 | 5.10 |
| Break | 323.6 | 184.8 | 222.4 |
| Strain | 311.7 | 301.8 | 261.2 |
| [%] | 315.7 | 315 | 297.9 |
|  | 304.6 | 347.2 | 238.8 |
|  | 316.3 | 292.7 | 277.6 |
| Avg. | 314.4 | 308.3 | 260.0 |
| STD | 7.0 | 24.5 | 29.4 |
| CV % | 2.2 | 7.9 | 11.3 |

FRG = free radical generating compound
Azo: Azodicarbonamide
Benz: Dibenzoyl peroxide

EXAMPLE 5

Recycled EPDM rubber 80 mesh particles (available from Erickson, Inc) were dispersed in an aqueous acetone solution (10% acetone) and were oxidized by adding 2% by weight $KMnO_4$. After 24 hours, the purple color of the $KMnO_4$ disappeared, indicating the completion of the reaction. The by-product, $MnO_2$, was further oxidized for separation by 30% $H_2O_2$ with 0.1% $H_2SO_4$ aqueous solution. The rubber was washed with water until the filtrate was neutral. Finally, the treated rubber was air-dried.

Figure 9:
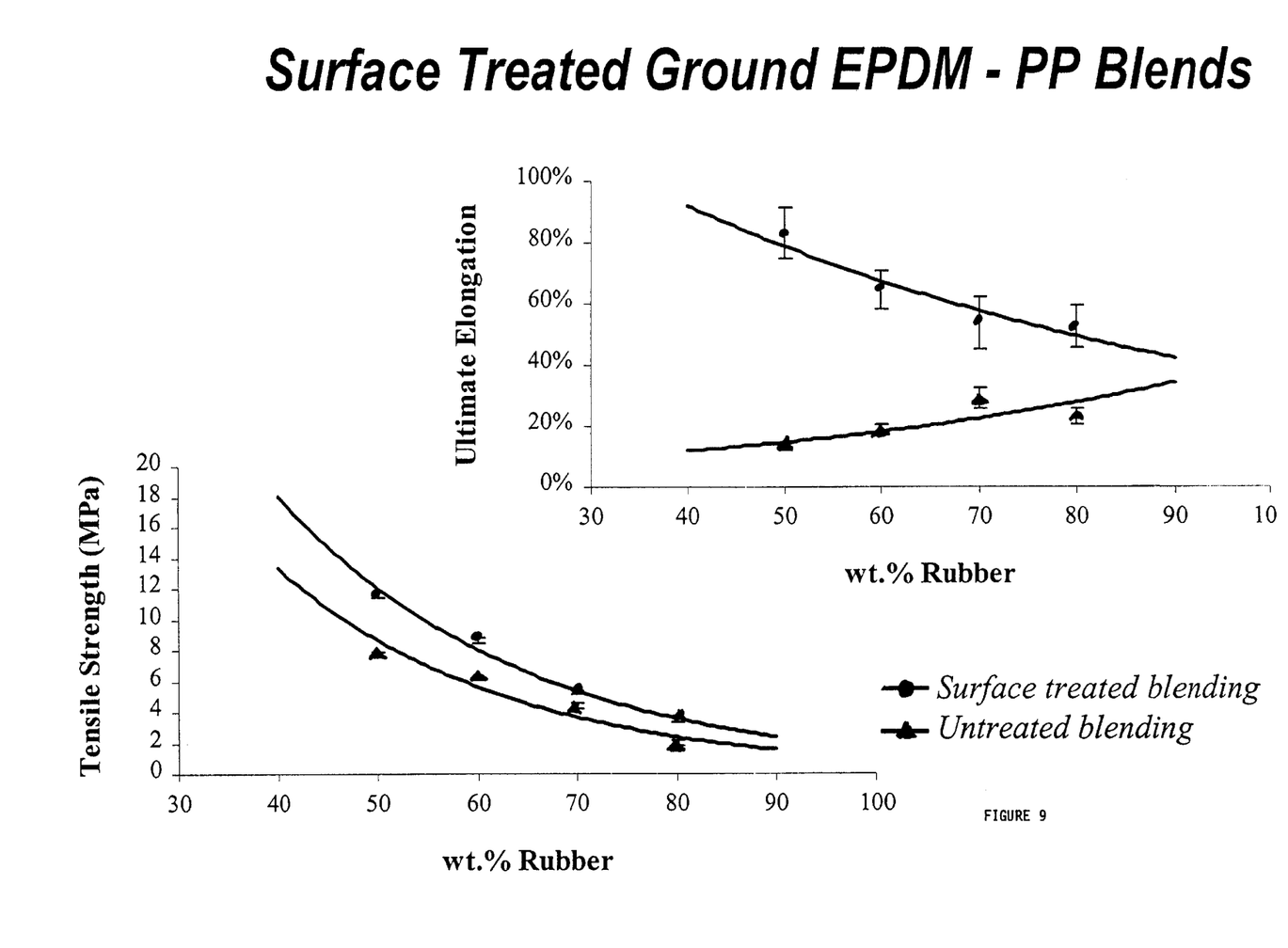
FIG. 9 contains graphs illustrating the effect of wt. % rubber on tensile strength and ultimate elongation for surface treated ground EPDM-PP blends.

Materials were mixed in a Rheocord System 40 (Haake Buechler). The mixer was preheated to the mixing temperature (190° C.) until the chamber temperature was stable, which took about 30 minutes. The rotor speed was set to 30 rpm and the thermoplastic material (Polypropylene, available from Eastman Tenite (12 MFI)) was added first. The rubber component was added after the plastic material was completely melted, as indicated by a stabilized torque reading, usually after 4 to 5 minutes. Maleated PP was added (at 0.4–3.2%) 1 minute after the rubber component. The mixing was stopped after the designated time (two to ten minutes), or when the torque became constant. The data obtained are shown in FIG. 9.

EXAMPLE 6

Figure 10:
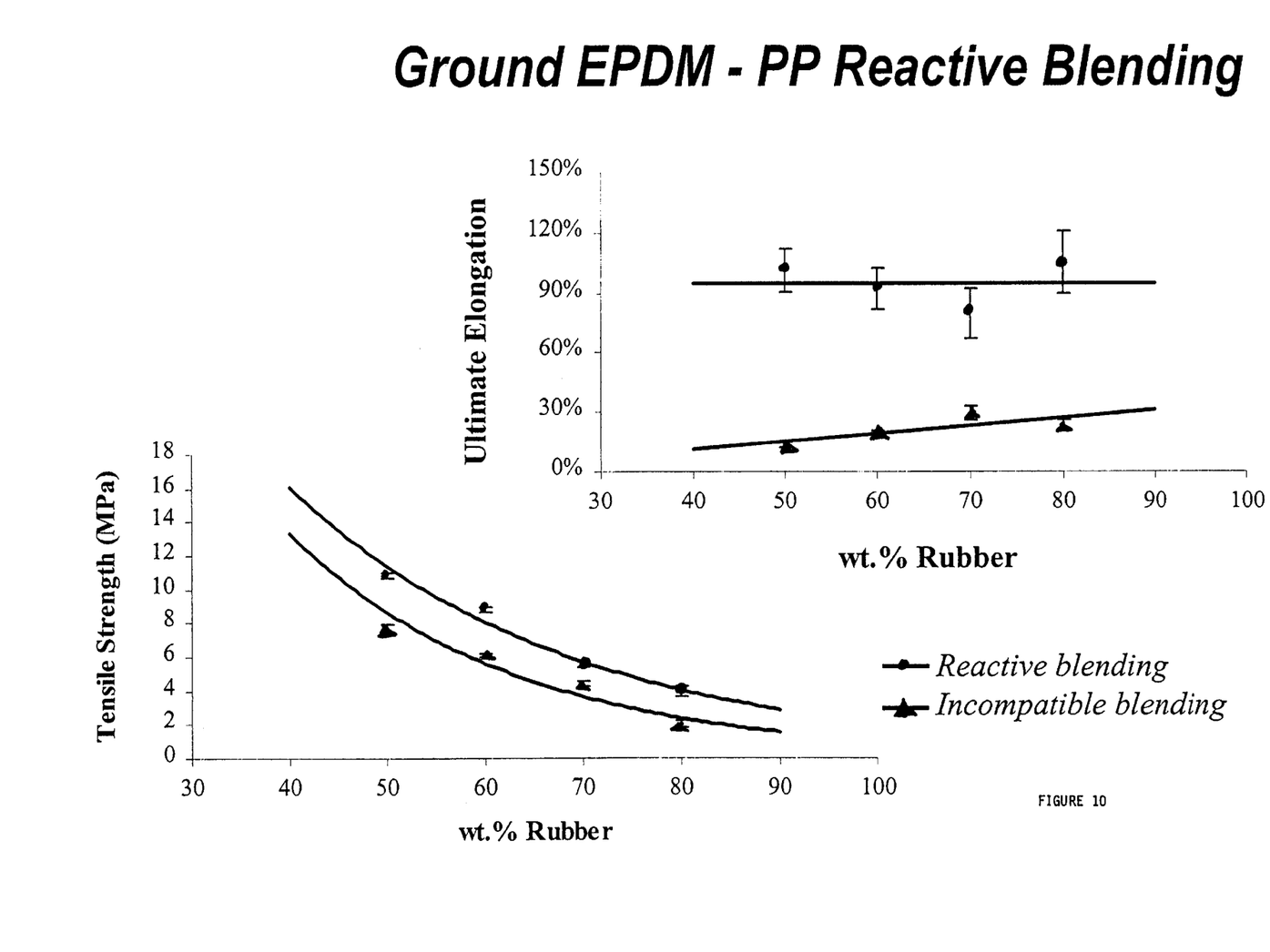
FIG. 10 contains graphs illustrating the effect of wt. % rubber on tensile strength and ultimate elongation for ground EPDM reactively blended with a radical initiator and blended with PP.
Figure 11:
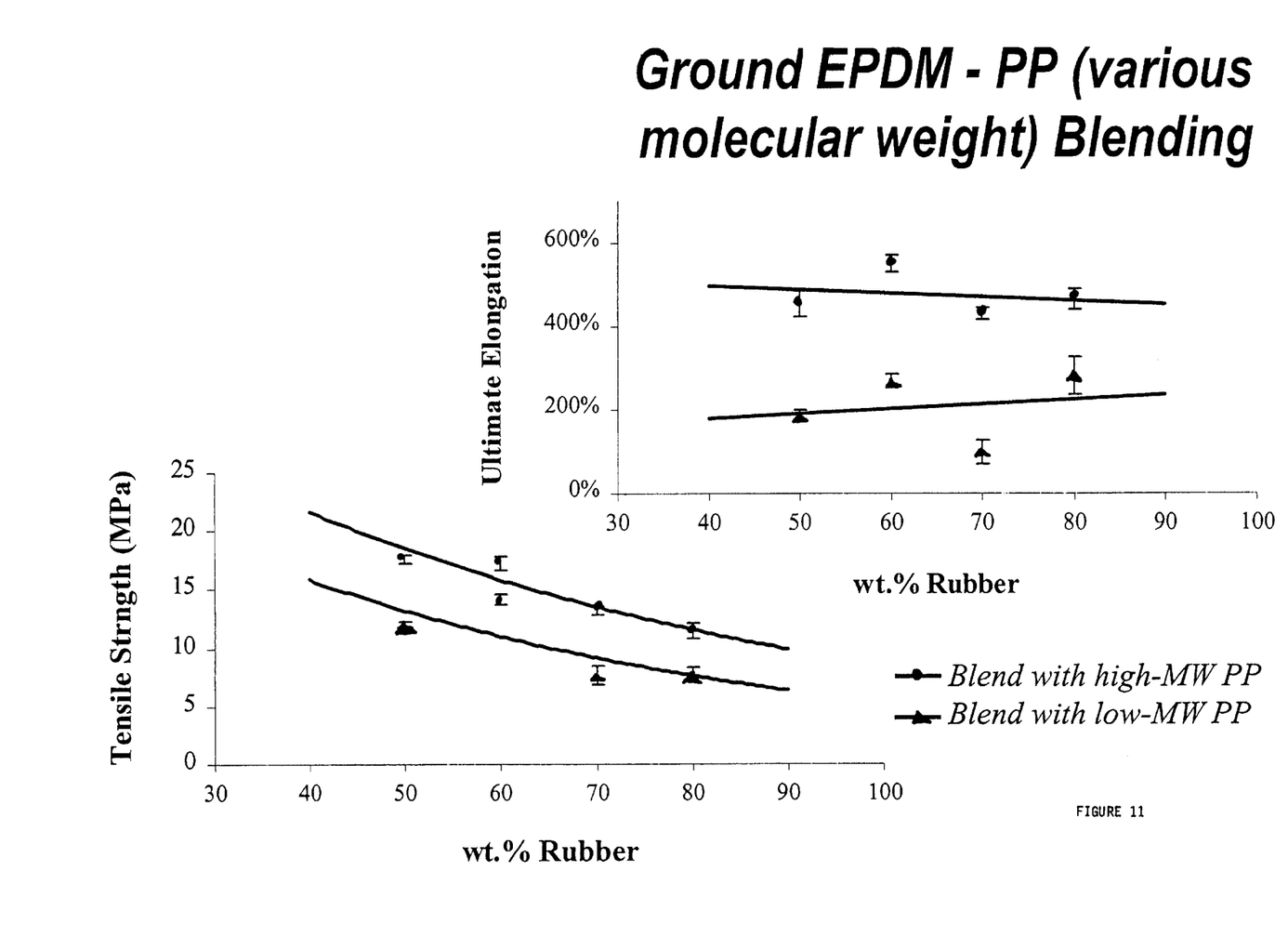
FIG. 11 contains graphs illustrating the effect of blending with high molecular weight PP on tensile strength and ultimate elongation for ground EPDM-PP blends.

Materials (recycled EPDM rubber, 80 or 170 mesh, from Erickson Inc.; PP, 0.75 (high molecular weight) & 12 MFI (low molecular weight), from Fina) were mixed in a Rheocord System 40 (Haake Buechler). After the equilibrium temperature (190° C.) and rotor speed (30 rpm) was reached, the thermoplastic (PP) material was added. The rubber portion (treated or untreated) was blended in after the plastic material was completely melted, as indicated by a stabilized torque reading, usually after 4 to 5 minutes. Reactive blending was accomplished by the addition of t-butyl hydroperoxide either to the blend immediately after the addition of rubber, or by soaking the rubber in the t-butyl hydroperoxide prior to blending. Mixing of the blend was stopped after a specified time (two to ten minutes), or when the torque became constant. The rubber-plastic composite was removed and then ground using a laboratory mill (Thomas Wiley, model 4) with a 40-mesh screen. The data obtained are shown in FIGS. 10 and 11.

EXAMPLE 7

Figure 12:
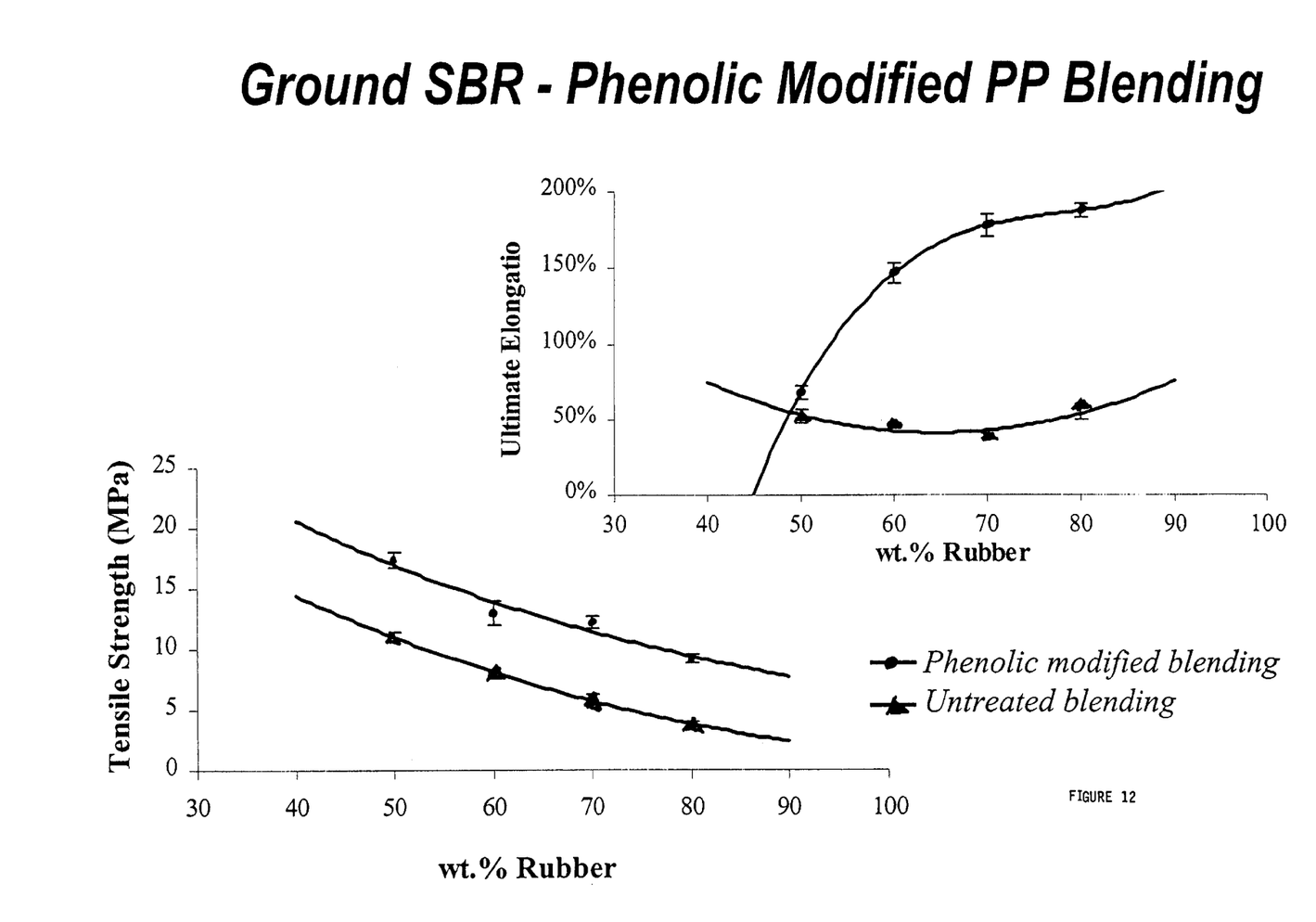
FIG. 12 contains graphs illustrating the effect of wt. % rubber on tensile strength and ultimate elongation for ground SBR-phenolic modified PP blends.

Materials (recycled SBR rubber, 80 mesh, from Erickson Inc.; Chemical grade 3181 PP, from Fina (84 $M_N$)) were mixed in a Rheocord System 40 (Haake Buechler). The mixer was preheated to the mixing temperature, 200° C., until stable (i.e., about 30 to 45 minutes). The rotor speed was set at 30 rpm. The rubber component was added when the PP was completely melted as indicated by a stabilized torque reading. For SBR/PP blending, the previously reported processing conditions of Coran and Patel, *Rubber Chem. Technol.*, 30, 1045 (1983) were followed. The data obtained are shown in FIG. 12.

EXAMPLE 8

Figure 13:
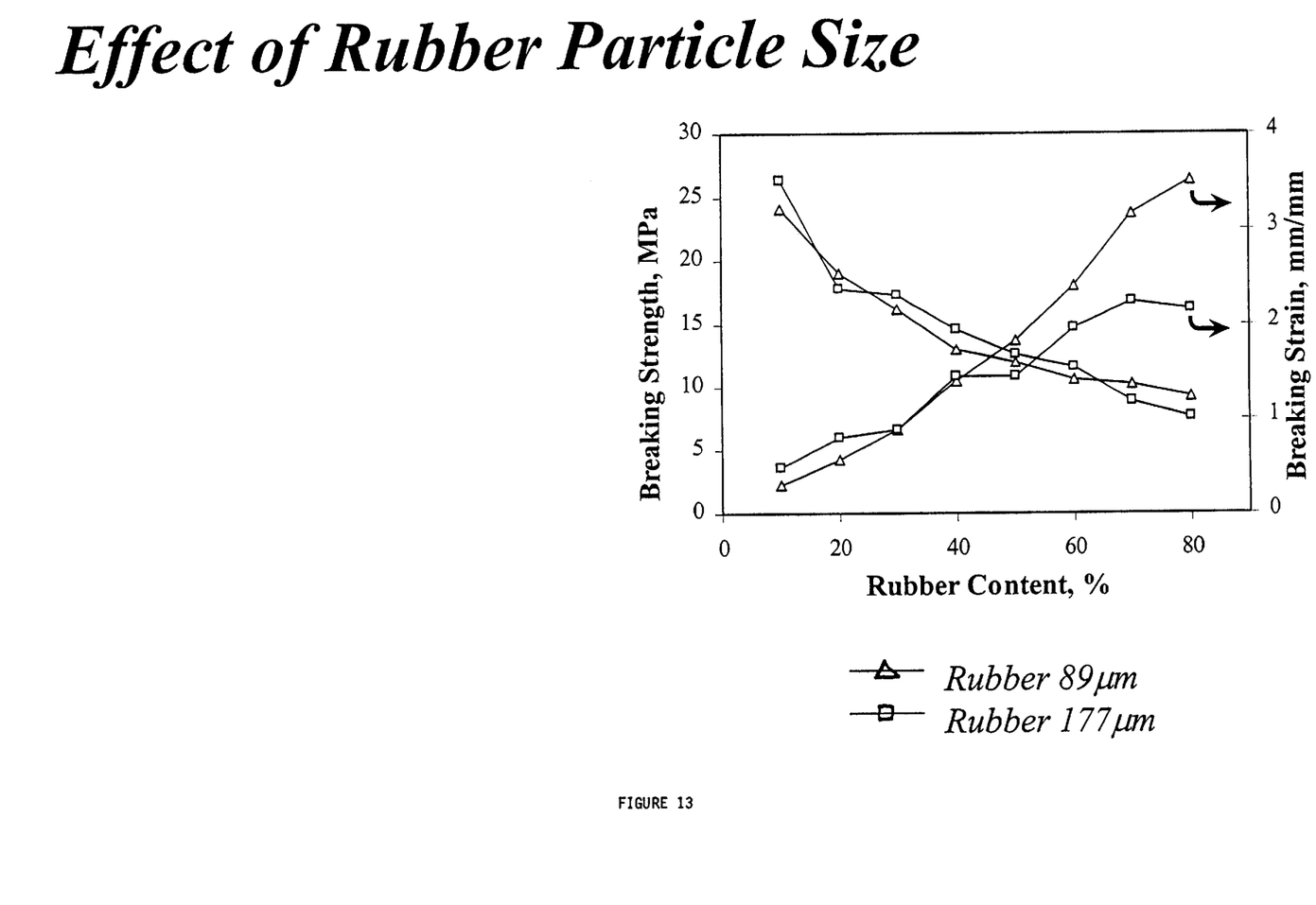
FIG. 13 is a graph illustrating the effect of rubber particle size on breaking strain and breaking strength for EPDM-PP blends.
Figure 14:
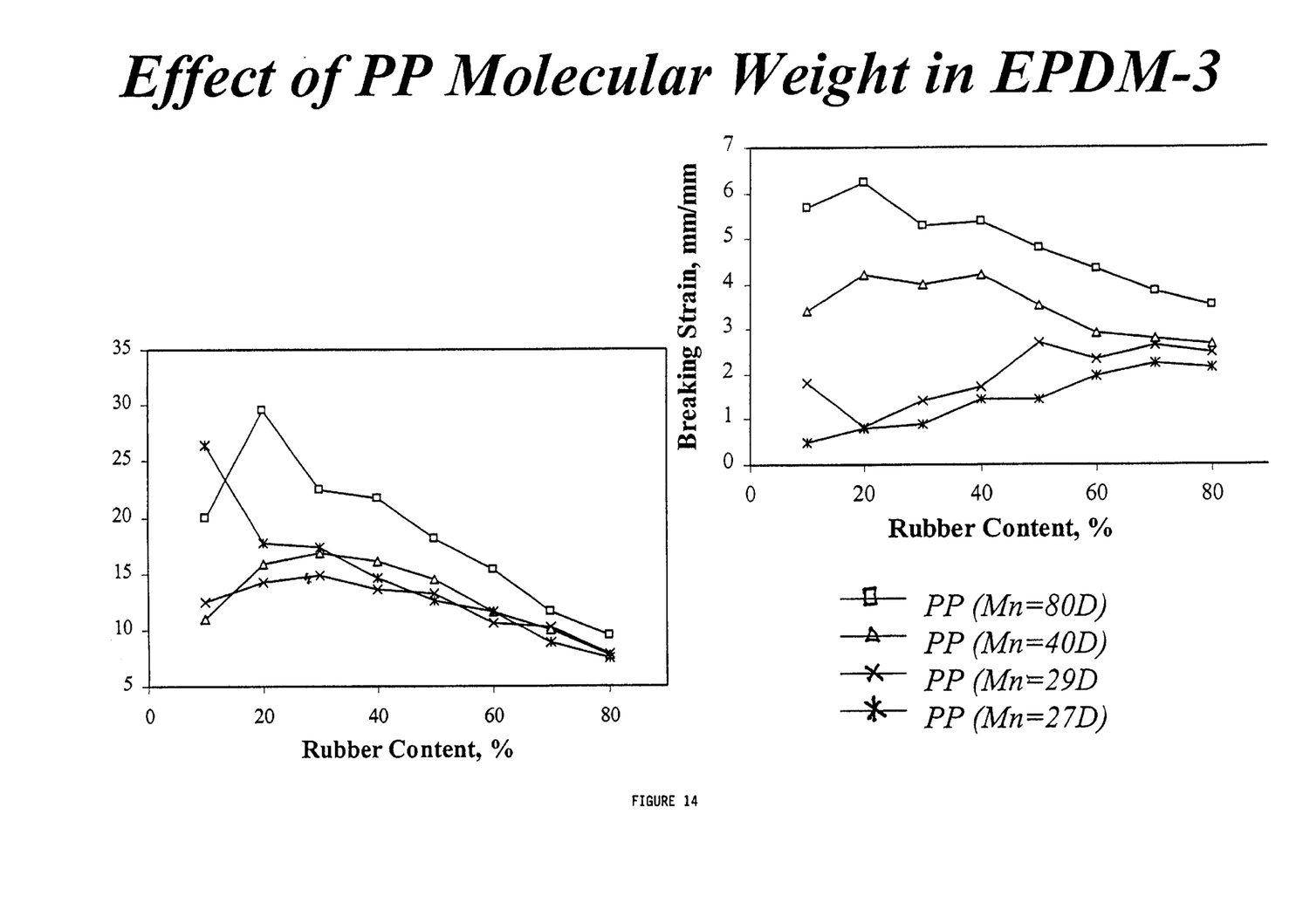
FIG. 14 contains graphs illustrating the effect of PP molecular weight on breaking strain and breaking strength for EPDM-PP blends.
Figure 15:
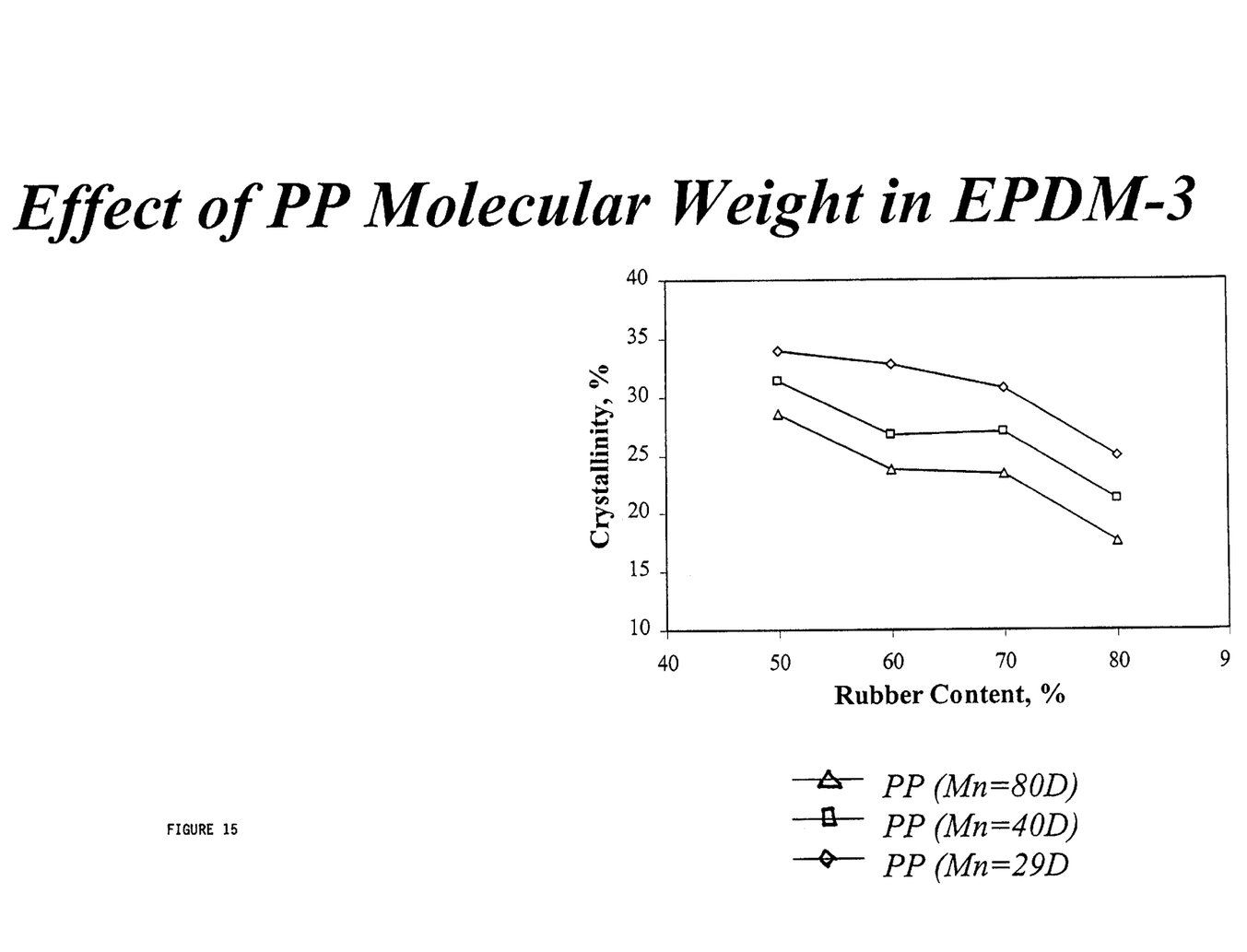
FIG. 15 is a graph illustrating the effect of PP molecular weight on crystallinity for EPDM-PP blends.

Materials (EPDM rubber, 80 or 170 mesh, from Rouse Rubber; PP grades 3181, 3429, 3622, and 3761 from Fina) were mixed in a Rheocord System 40 (Haake Buechler). The mixer was preheated to the mixing temperature, 200° C., until stable (i.e., about 30 to 45 minutes). The rotor speed was set at 30 rpm. The rubber component was added when the PP was completely melted as indicated by a stabilized torque reading. In the case of EPDM/PP reactive blending, chemical additives, as noted below in tables 6–8 were added two minutes after the addition of the rubber. Mixing continued for an additional two minutes. The data obtained are shown in FIGS. 13, 14, and 15.

TABLE 6

Materials Used

Plastic Materials

| | Commercial Name | Manufacturer | MFI (g/10 min) |
|---|---|---|---|
| PP | Tenite | Eastman Co. | 12 |
| | — | Fina Co. | 4.5 |
| | Profax | Montell Co. | 0.45 |
| Ethylene-Octene Copolymer | Engage 8100 | Dow Chemical Co. | 1 |

Rubber Materials

| | Formula | Manufacturer | Mesh size |
|---|---|---|---|
| Recycled SBR | — | Erickson Inc. | 80 |
| Recycled EPDM | | Erickson Inc. | 80, 170 |

Additives

| | Formula | Manufacturer | Concentration (%) |
|---|---|---|---|
| t-Butyl Hydroperoxide | — | Aldrich Co. | 35 |
| Potassium Permanganate | KMnO$_4$ | Aldrich Co. | 90 |
| Hydrogen Peroxide | H$_2$O$_2$ | Aldrich Co. | 30 |
| Sulfuric Acid | H$_2$SO$_4$ | Aldrich Co. | 99.5 |
| Maleated PP | | Aristech Chemical Co. | |

TABLE 7

Recycled Rubber Characterization Data

| Material | Supplier | Source | Particle Size (μm) | p (g/cc) | T$_g$ (° C.) |
|---|---|---|---|---|---|
| EPDM-1 | Erickson | Shoe Sole | 177 | 1.19 | −55 |
| EPDM-2 | Rouse | Roofing | 89 | 1.14 | — |
| EPDM-3 | Rouse | Roofing | 177 | 1.14 | — |
| SBR | Erickson | Tire | 89 | — | −56 |
| NR/SBR | Rouse | Tire | 89 | 1.14 | — |

TABLE 8

Characterization Data For Polypropylenes

| Material | Supplier | M$_N$ (D) | M$_w$/M$_N$ | T$_m$ (° C.) | Crystallinity (%) | σ$_b$ (MPa) | σ$_y$ (MPa) | ε$_b$ (%) |
|---|---|---|---|---|---|---|---|---|
| PP-3181 | Fina | 84 | 6.1 | 172 | 30 | 41 | 30 | 760 |
| PP-3429 | Fina | 40 | 7.0 | 171 | 42 | 44 | 32 | 844 |
| PP-3622 | Fina | 29 | 6.6 | 173 | 55 | 28 | 32 | 672 |
| PP-3761 | Fina | 27 | 7.4 | 171 | 59 | 16 | 32 | 528 |
| PP-4011 | Huntsman | | | | 65 | 17 | 37 | 512 |

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for recycling a thermoset rubber material to obtain a useful material, comprising:
   providing particles of a thermoset rubber material;
   providing particles of a thermoplastic material;
   melt-blending the thermoset rubber particles and the thermoplastic particles in the presence of a free radical generating compound at a temperature at or above the activation temperature of the free radical generating compound, wherein the free radical generating compound is present at a concentration in the range of about 0.5 to 5% by weight of the rubber particles; and
   yielding a material selected from the group consisting of a thermoplastic elastomer and an impact-strengthened thermoplastic having an elongational capability at least double that of the thermoplastic material.

2. The method of claim 1, wherein the thermoplastic material is selected from the group consisting of polyolefins, polystyrenes, copolymers of polystyrenes, polyurethanes, copolymers of polyurethanues, polyesters, copolymers of polyesters, vinyl polymers, vinyl copolymers, polyamides, and copolymers of polyamides.

3. The method of claim 2, wherein the thermoplastic material has a melt flow index in the range of about 0.45 to 20 g/10 minutes.

4. The method of claim 2, wherein the thermoset rubber material is present in an amount in the range of about 5 to 85 wt. %.

5. The method of claim 2, wherein the free radical generating compound is selected from the group consisting of peroxides and azo compounds.

6. The method of claim 5, wherein the peroxides are selected from the group consisting of dibenzoyl peroxide, t-butylperoxide, t-butyl hydroperoxide, and di-tert butyl peroxide.

7. The method of claim 5, wherein the azo compounds are selected from the group consisting of 1,1'-azobis (cyclohexanecarbonitrile); azodicarbonamide; 2,2'-azobis(2, 4-dimethylpentenenitrile); 2,2'-azobis(2-ethylpropanimidamide).2HCl; 2,2'-azobis(isbutyronitrile); 2,2'-azobis(2-methyl-butanenitrile); 4,4'-azobis(4-cyanopentanoic acid); 2,2'-azobis(2-acetoxypropane); 2-(tert-butylazo)-4-methoxy-2,4-dimethylpentanenitrile; 2-(tert-butylazo)-2,4-dimethylpentanenitrile; 4-(tert-butylazo)-4-cyanopentanoic acid; 2-(tert-butylazo) isobutyronitrile; 2-(tert-butylazo)-2-methylbutanenitrile; 1-(tert-amylazo)cyclohexanecarbonitrile; 1-(tert-butylazo) cyclohexanecarbonitrile; and 1-(tert-butylazo)-formamide.

8. The method of claim 1, wherein the thermoplastic material is melted is melted before melt blending with the thermoset rubber material.

9. The method of claim 8, wherein the free radical generating compound is added to the thermoset rubber material before melt blending the thermoset rubber material with the thermoplastic material.

10. The method of claim 1, wherein the thermoplastic material, the thermoset rubber material, and the free radical generating compound are combined and melt blended simultaneously.

11. The method of claim 1, wherein the free radical generating compound is combined with the thermoset rubber material before combining and melt blending with the thermoplastic material.

12. A thermoplastic product produced by melt blending particles of a thermoset rubber compound with particles of a thermoplastic compound in the presence of about 0.5 to 5 wt. % of a free radical generating compound at a temperature at or above the activation temperature of the free radical generating compound, the thermoplastic product having an elongational capability at least double that of the thermoplastic component.

13. The method of claim 12, wherein the free radical generating compound is selected from the group consisting of peroxides and azo compounds.

14. The method of claim 13, wherein the peroxides are selected from the group consisting of dibenzoyl peroxide, t-butylperoxide, t-butyl hydroperoxide, and di-tert butyl peroxide.

15. The method of claim 13, wherein the azo compounds are selected from the group consisting of 1,1'-azobis (cyclohexanecarbonitrile); azodicarbonamide; 2,2'-azobis(2, 4-dimethylpentenenitrile); 2,2'-azobis(2-ethylpropanimidamide).2HCl; 2,2'-azobis(isbutyronitrile); 2,2'-azobis(2-methyl-butanenitrile); 4,4'-azobis(4-cyanopentanoic acid); 2,2'-azobis(2-acetoxypropane); 2-(tert-butylazo)-4-methoxy-2,4-dimethylpentanenitrile; 2-(tert-butylazo)-2,4-dimethylpentanenitrile; 4-(tert-butylazo)-4-cyanopentanoic acid; 2-(tert-butylazo) isobutyronitrile; 2-(tert-butylazo)-2-methylbutanenitrile; 1-(tert-amylazo)cyclohexanecarbonitrile; 1-(tert-butylazo) cyclohexanecarbonitrile; and 1-(tert-butylazo)-formamide.

* * * * *